United States Patent
Ferguson

(10) Patent No.: US 6,599,452 B1
(45) Date of Patent: Jul. 29, 2003

(54) METHOD FOR MANUFACTURING SIMULATED ARCHITECTURAL FORMS

(75) Inventor: Samuel J. Ferguson, Weston, FL (US)

(73) Assignee: Bevona, Inc., Mangonia Park, FL (US)

( * ) Notice: Subject to any disclaimer, the term of this patent is extended or adjusted under 35 U.S.C. 154(b) by 0 days.

(21) Appl. No.: 10/173,046

(22) Filed: Jun. 17, 2002

(51) Int. Cl.⁷ .......................... B29C 33/40; B29C 44/06
(52) U.S. Cl. .................. 264/46.4; 264/219; 264/225; 264/227; 264/255; 264/338
(58) Field of Search ................. 264/45.3, 255, 264/46.4, 219, 220, 225, 227, 338

(56) References Cited

U.S. PATENT DOCUMENTS

| | | | |
|---|---|---|---|
| 3,055,148 A | * | 9/1962 | Christy ...................... 52/309.1 |
| 3,097,080 A | * | 7/1963 | Weir ........................... 427/201 |
| 3,703,572 A | * | 11/1972 | Bellasalma ................. 264/510 |
| 3,815,200 A | * | 6/1974 | Adams ..................... 29/894.32 |
| 4,385,088 A | | 5/1983 | Baskin |
| 4,668,451 A | * | 5/1987 | Langson ...................... 264/39 |
| 4,734,302 A | | 3/1988 | Baskin |
| 4,877,656 A | | 10/1989 | Baskin |
| 4,908,257 A | | 3/1990 | Baskin |
| 4,940,558 A | * | 7/1990 | Jarboe et al. .............. 264/46.7 |
| 4,966,794 A | | 10/1990 | Hasegawa et al. |
| 5,055,327 A | | 10/1991 | Baskin |
| 5,232,646 A | * | 8/1993 | Nasvik et al. .............. 264/133 |
| 5,244,941 A | | 9/1993 | Bruckbauer et al. |
| 5,275,852 A | | 1/1994 | Jones et al. |
| 5,359,817 A | | 11/1994 | Fulton |
| 5,620,642 A | | 4/1997 | Kamite et al. |
| 5,624,615 A | | 4/1997 | Sandorff |
| 5,634,307 A | | 6/1997 | Larriberot et al. |
| 5,787,667 A | | 8/1998 | Sheahan et al. |
| 5,911,927 A | * | 6/1999 | Roberts ..................... 264/46.4 |
| 6,042,766 A | * | 3/2000 | Bahr ........................ 264/46.6 |
| 6,054,080 A | | 4/2000 | Sheahan et al. |
| 6,093,356 A | * | 7/2000 | Albertelli .................... 264/247 |
| 6,355,193 B1 | * | 3/2002 | Stott ........................ 264/46.5 |

* cited by examiner

Primary Examiner—Allan R. Kuhns
(74) Attorney, Agent, or Firm—Glenn E. Gold; H. John Rizvi; Gold & Rizvi, P.A.

(57) ABSTRACT

A method is provided for manufacturing molded simulated stone and wood architectural articles for buildings and homes. The method incorporates a unique mold assembly including a resilient silicone rubber mold supported within a rigid mold cradle/foundation, and a vented lid having a High-Density Polyethylene (HDPE) interior surface. The silicone rubber mold is initially treated with a liquid polyester gel coating that is cured and then coated with an acrylic/vinyl ester back coating. Once the back coating is cured, a predetermined volume of a modified high-density, natural mineral fiber-reinforced, 2-component hybrid polyurethane liquid expanding composition is dispensed therein and the mold is covered with the vented lid. The system is pressurized and heated to produce a molecularly-fused, lightweight rigid article having the desired architectural shape.

12 Claims, 9 Drawing Sheets

METHOD FOR MANUFACTURING SIMULATED ARCHITECTURAL FORMS

BACKGROUND OF THE INVENTION

1. Field of the Invention

The present invention relates generally to non-structural, decorative architectural products, and more particularly to a method and apparatus for inexpensively manufacturing highly-durable simulated stone and wood architectural products for buildings, homes and the like.

2. Description of the Prior Art

Historically, natural stone or wood architectural shapes and forms have been cut or carved from natural material to achieve the desired design; that is, to achieve the desired shape, surface contour and surface texture. However, this proved to be a time consuming, high maintenance, and labor-intensive process. Furthermore, the high costs associated with the manufacturing, shipping, handling and installation of the products rendered such products cost prohibitive for many potential purchasers.

As the demand for such products has increased over the years, the architectural stone manufacturing industry has resorted to a casting method wherein a mixture of portland cement, sand and water are poured into a mold form or cavity and allowed to cure for at least several hours. With regard to wood architectural shapes and forms, generally, a natural piece of wood is selected, kiln dried, finished and installed. Like most natural products, wood requires ongoing maintenance and care. Additionally, the limited availability of select cuts of wood is an ongoing concern in the natural wood industry, restricting production and driving up manufacturing costs.

With regard to the cast stone industry, some improvements have been achieved in recent years. Most notably, methods have been developed for spray deposition of a lighter fiber-reinforced version of the cement-based composition. However, the need remains for a simpler, more efficient and more cost effective method of producing stone and wood architectural shapes and forms. Furthermore, it would be desirable to provide such a method whereby the resultant products have a lighter weight, greater environmental durability and dimensional stability, and less residual stress than comparable articles produced using prior art methods.

SUMMARY OF THE INVENTION

The present invention provides a method and apparatus for manufacturing simulated cast stone and simulated natural wood architectural products.

In one aspect of the present invention, a mold assembly for manufacturing an article having a simulated stone or wood appearance is provided. The mold assembly generally comprises a mold box having a solid polymer support cradle disposed within the mold box. The support cradle includes a contoured cavity formed in its upper surface, a silicone rubber mold having a lower surface form-fitted to the contoured cavity of the solid support cradle, and a vented mold lid.

In another aspect of the present invention, a method for manufacturing a mold assembly to produce an article having a simulated stone or wood appearance is provided. Initially, a master form having a shape, surface contour and surface texture replicating the shape, surface contour and surface texture of the final product is mounted on a support base. A master mold cradle is provided having an integral cavity having a shape and surface contour substantially identical to the shape and surface contour of the master form, but having dimensions greater than the corresponding dimensions of the master form. The mold cradle is seated over the master form, creating a gap. The gap is subsequently filled with a resilient mold material, such as a silicone mold rubber, the mold material is cured, and the master form and master form base are separated from the master mold cradle.

In a further aspect of the present invention, a method is provided for manufacturing an article having a simulated stone or wood appearance. Initially, a resilient mold having a mold cavity formed in its upper surface is provided supported within a corresponding polymer mold cradle cavity. The mold cavity is initially coated with one or more layers of a mineral fiber reinforced polyester gel face coat and allowed to gel cure for about 30 minutes. Subsequently, a mineral fiber-reinforced acrylic/vinyl ester back coating is applied to the face coating and allowed to gel cure for about 30 minutes. Within a few minutes thereafter, a predetermined volume of mineral fiber-reinforced high-density closed-cell polyurethane polymer is dispensed into the mold cavity, the mold cavity is covered with a vented mold lid, and placed in a press for about 10 minutes. Subsequently, the mold is removed from the press and the composition is allowed to cure for an additional period of about 10 minutes before being removed from the mold. Preferably, a peanut oil and polymer blend is applied to the mold cavity prior to forming the back coat and face coat to facilitate removal of the final product from the mold.

In yet a further aspect of the present invention, an architectural article having a simulated stone or wood appearance is provided. The article is comprised of a mineral fiber-reinforced high-density closed cell polyurethane polymer core, a mineral fiber-reinforced polyester gel face coating, and a mineral fiber-reinforced acrylic/vinyl ester back coating interposed between, and molecularly fused to, the core and face coating.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Shown throughout the figures, the present invention is generally directed to a method and apparatus for manufacturing simulated cast stone and simulated natural wood architectural products, as well as the simulated cast stone and natural wood products thereby produced. In comparison to other methods known in the art for manufacturing such simulated articles, the method of the present invention provides a significant reduction in manufacturing time and manufacturing cost. The time and cost savings result from a simplified method that is less labor intensive and utilizes less expensive equipment and materials than other known methods. Furthermore, the manufacturing method of the present invention results in a product having a lighter weight, greater environmental durability and dimensional stability, and less residual stress than comparable articles produced using prior art methods.

In order to manufacture the simulated cast stone and simulated wood articles having the desired properties, the present invention incorporates a novel mold assembly construction. Initially, the structure and fabrication of the novel mold assembly is described. Subsequently, the materials and processes used to construct the articles of the present invention are described.

The mold assembly is generally comprised of a resilient mold, a mold-supporting cradle, and a mold lid.

The Master Form

A master mold casting having a substantially identical form and surface texture as the final article is fabricated. As described in greater detail below, this master form is used to fabricate the resilient mold portion of the mold assembly.

The master form can be created from a design. Alternatively, the master can be created from an actual existing form such as a real piece of wood. With regard to the former case, there are a variety of ways to create an original master or model, such as reproducing a known design, creating a form from a unique computer-aided design (CAD) and having an original carved by an artist, to name just a few.

Figure 1:
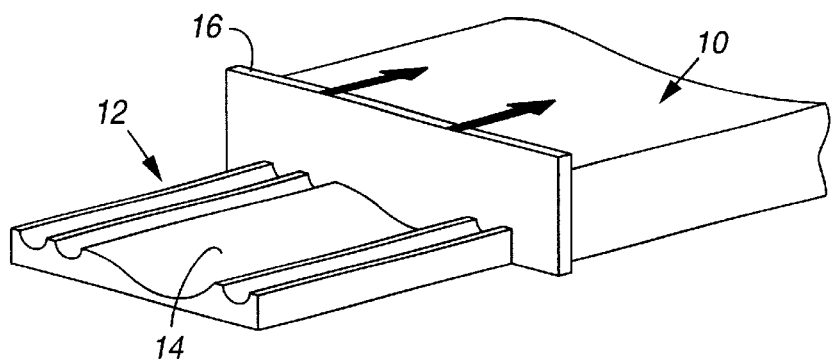
FIG. 1 is a perspective view illustrating the shaping of a negative form from a block of wet plaster using a shape cutter, in accordance with the present invention.
Figure 2:
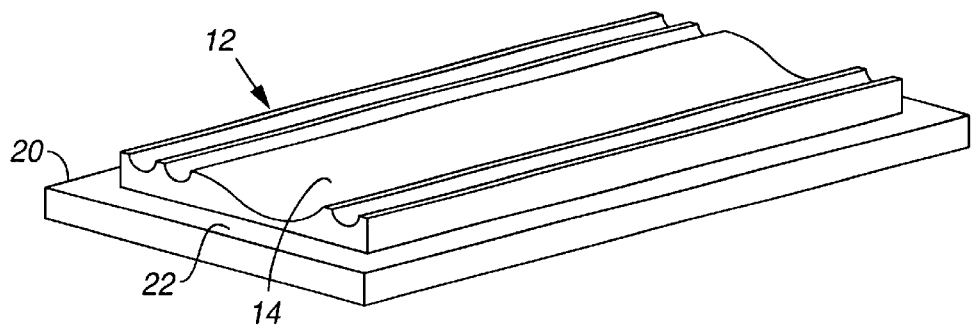
FIG. 2 is a perspective view of the negative form of FIG. 1 mounted on a base substrate.

Referring initially to FIGS. 1–2, where a master form is to be created from a design, a profile blade or template 16 is created having the negative profile of the desired positive master form. For example, the profile blade 16 can be manufactured directly from a CAD drawing. Using the profile blade 16, a negative form 12 having negative surface contour 14 is cut from a slab of wet plaster 10 and hardened. Subsequently, the negative form 12 is mounted on the upper surface 22 of a plywood base 20 for use creating a positive master form having the same size, shape, surface profile and texture desired in the final article.

Figure 3:
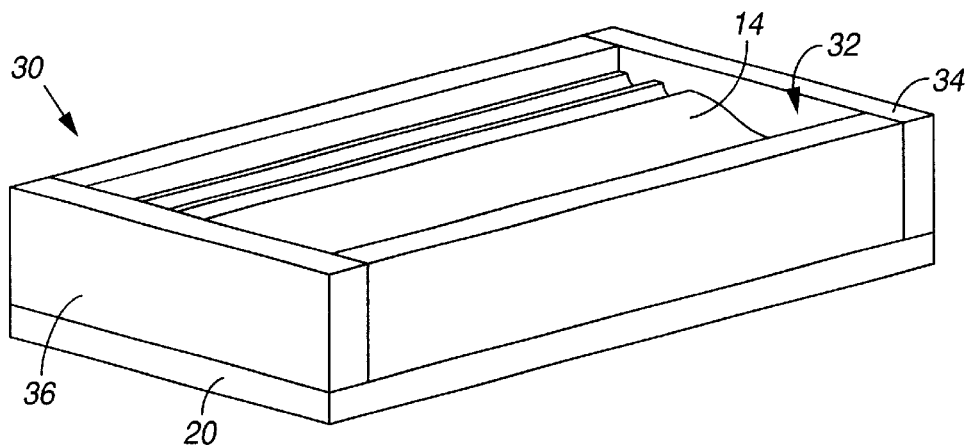
FIG. 3 is a perspective view of a mold assembly incorporating the mounted negative form of FIG. 2.
Figure 4:
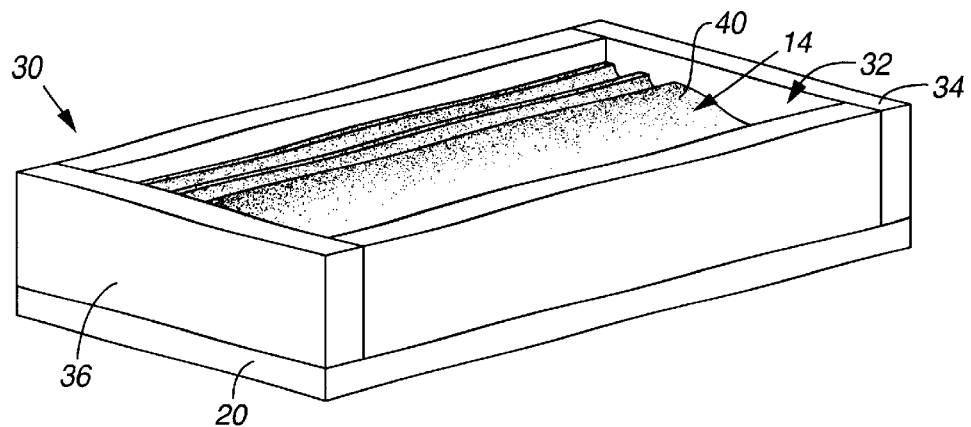
FIG. 4 is a perspective view of the mold assembly of FIG. 3 having texture-producing particles deposited within the mold cavity.
Figure 5:
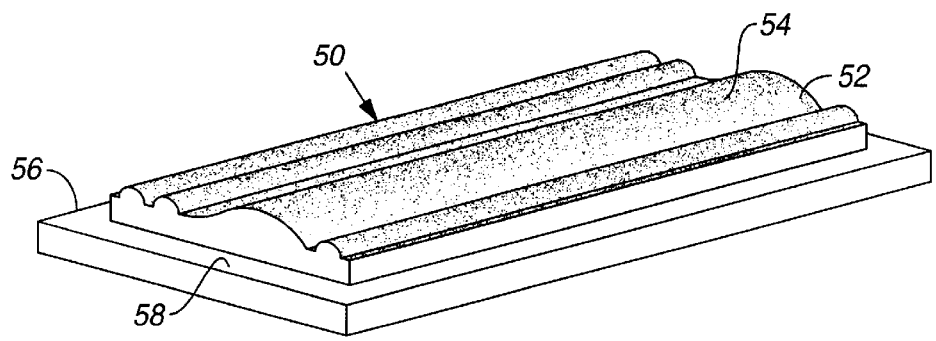
FIG. 5 is a perspective view of a master (positive) form having a textured surface produced using the mold assembly of FIG. 4, wherein the master form has been mounted on a base substrate for subsequent use producing a rubber production mold, in accordance with the present invention.

Referring now to FIGS. 3–5, a mold assembly, shown generally as reference numeral 30, is constructed for use fabricating the positive master form 50 (FIG. 5). Initially, plywood side panels 36 are erected along the upper surface 22 of base 20 such that they bound the peripheral edges of negative form 12. In this manner, a mold cavity 32 is formed having the desired size, shape and surface contour of the master form 50.

Preferably, a mold release (not shown) is applied to upper surface 14 of negative form 12 as well as to the exposed interior surfaces of side panels 36 to facilitate the removal of the master form 50 from the mold 30. It will be apparent to those skilled in the art that various mold release materials and/or compositions could be employed to facilitate the release of master form 50 from the mold 30. However, it is preferred to use a composition comprising peanut oil with blended polymer developed by the present inventor following considerable experimentation. Significantly, a number of benefits are derived from the incorporation of a peanut oil based mold release material. For instance, the use of a naturally occurring product contributes to an environmentally friendly manufacturing process. Furthermore, the peanut oil tends to absorb into the mold and form materials used during the manufacturing process, substantially eliminating the occurrence of delamination caused by surface residue common with other mold release materials.

Where a particular surface texture is desired, texture-producing particles 40 can be introduced upon the upper surface 14 of negative form 12. For example, I have found success using baking soda powder to produce a very realistic looking stone surface texture. The previously applied mold release has the additional benefit of causing the baking soda particles to adhere to upper surface 14. Cavity 32 of mold assembly 30 is subsequently filled, to a level at or below upper edge 34 of side panels 36, with a cement composition. Once the cement has cured, or hardened, the resulting master form 50 having an upper surface 52 and integral surface texture 54 is mounted upon upper surface 58 of plywood base substrate 56.

Generally, where the present invention is used to create a simulated wood article, the master form 50 is comprised of an actual piece of wood from which the simulated article is replicated. Consequently, in lieu of the aforementioned steps associated with creating a master form for producing a stone replication, the piece of wood is soaked in the above-described preferred mold release and mounted to the upper surface 58 of supporting substrate 56.

The Mold Cradle

The mold cradle is fabricated prior to fabricating the resilient mold. This is necessary because the mold cradle is used to both fabricate the resilient mold and, subsequently, support the resilient mold.

Figure 6:
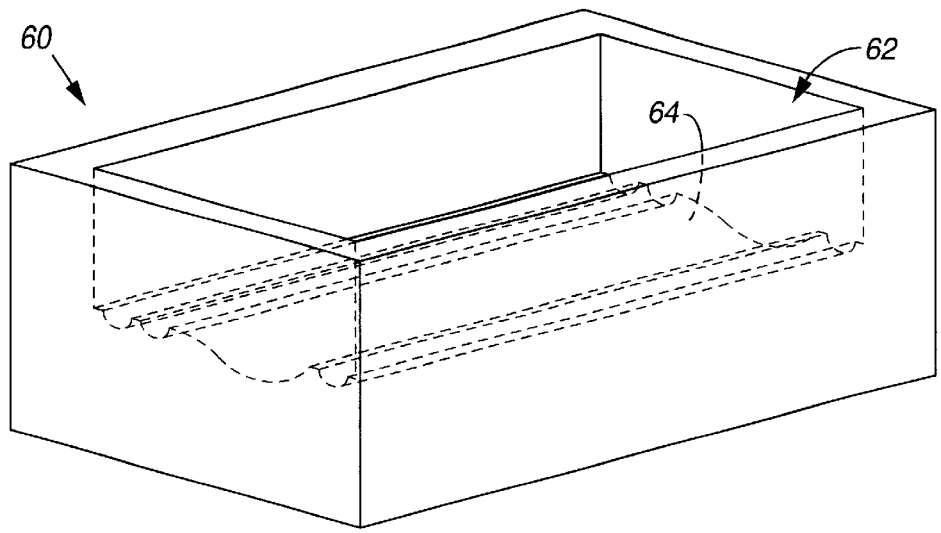
FIG. 6 is a perspective view of a nominally oversized Expanded Polystyrene (EPS) temporary mold used during the fabrication of a mold cradle, in accordance with the present invention.
Figure 7:
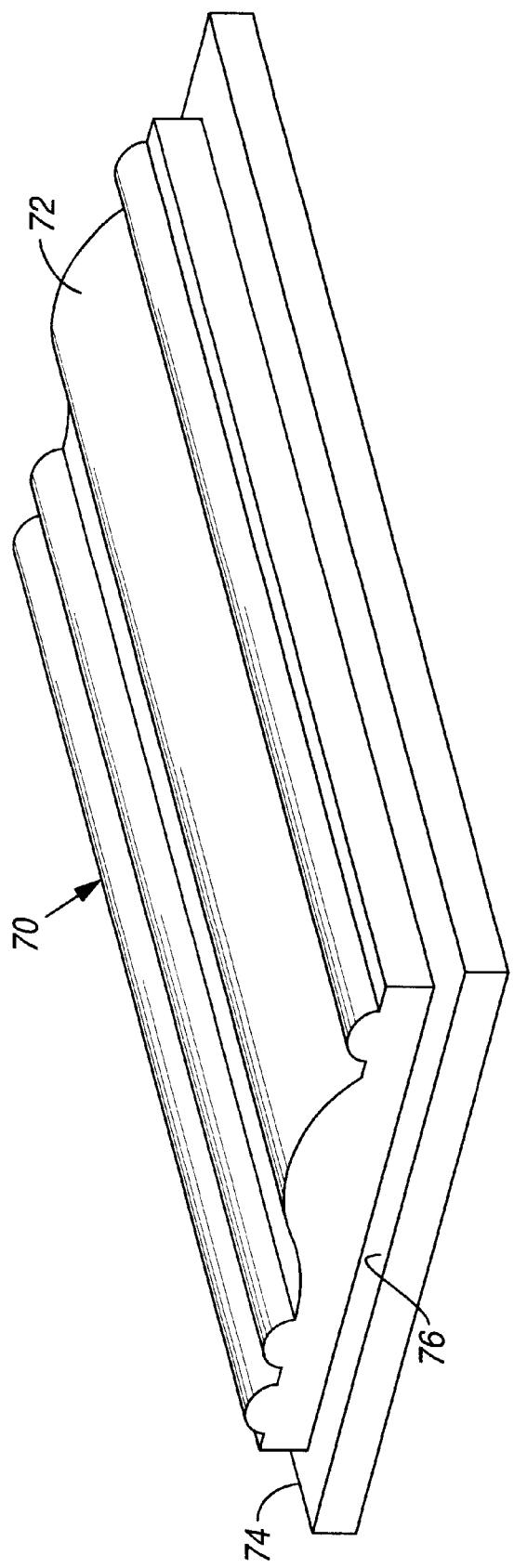
FIG. 7 is a perspective view of a nominally oversized positive form produced using the EPS mold of FIG. 6, wherein the oversized form has been mounted on a base substrate.

Referring now to FIGS. 6–7, a mold 60 is initially provided having a surface contour 64 substantially identical to the contour of upper surface 14 of negative form 12. For reasons that will become apparent, mold 60 is provided having a nominally deeper cavity 62 and nominally larger overall dimensions vis-a-vis mold assembly 30. Preferably, mold 60 is fabricated from a low cost expanded polystyrene (EPS) material, such as that sold under the trade name Styrofoam®. Preferably, the EPS mold is treated with the aforementioned peanut oil blended polymer mold release material and then filled with a liquid polyurethane elastomer.

The polyurethane elastomer is cured at approximately 38° C. for about 20 minutes, and the resulting oversized positive form 70 having an upper surface contour 72 is mounted upon the upper surface 76 of supporting substrate 74. Subsequently, the rigid elastomer form 70 is treated with a release agent and coated with one or more layers of a mineral fiber-reinforced hybrid polymer. With regard to the mineral fiber used, wollastonite is preferred. In addition to being relatively inexpensive, wollastonite is non-toxic and biodegradable. Consequently, its use contributes to a safer manufacturing environment and a more environmentally friendly product. Wollastonite is commercially available from a variety of manufacturers including NYCO Minerals, Inc. of Willsboro, N.Y.

Figure 8:
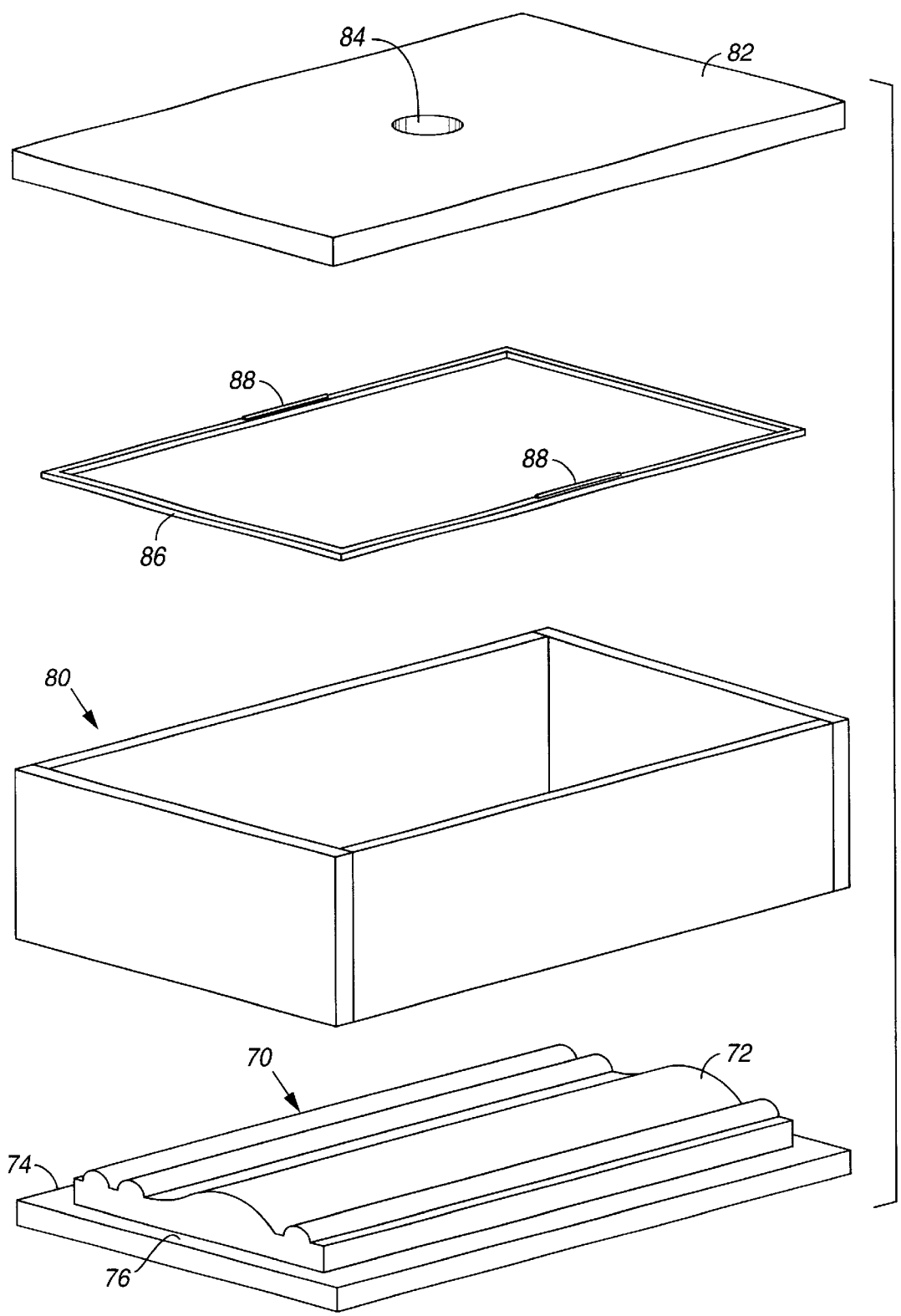
FIG. 8 is an exploded perspective view of an assembly used to create a mold cradle, in accordance with the present invention.
Figure 9:
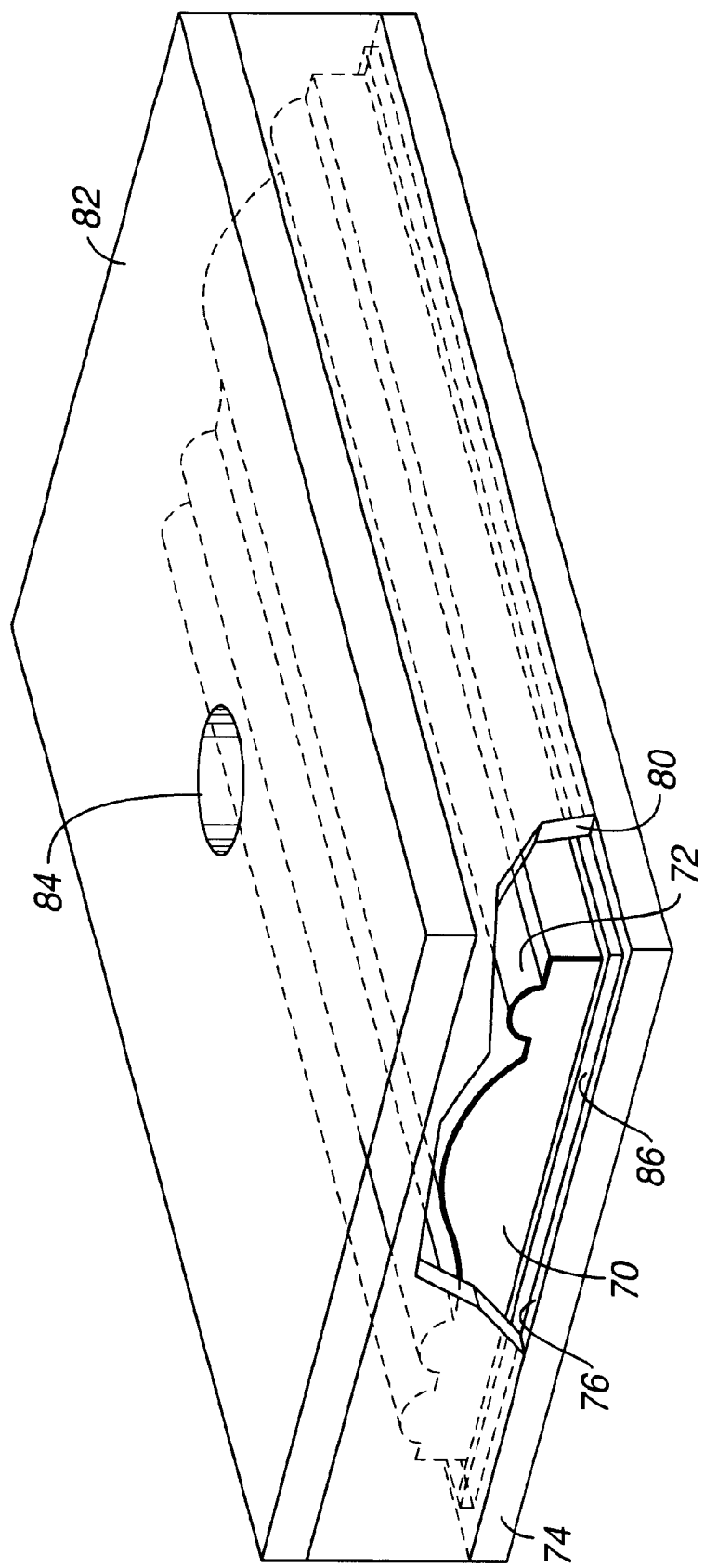
FIG. 9 is a perspective view of the assembly of FIG. 8 in an assembled state with the side panels partially cut away.

Referring now to FIGS. 8–9, wood side panels, shown generally as reference numeral 80, are attached about the periphery of upper surface 76. A rectangular frame 86 having raised surface portions 88 is positioned on the upper surface 76 of wood base 74 between the interior surface of side walls 80 and the periphery of mold form 70. A wood cover 82 having a sprue hole 84 drilled therethrough is subsequently attached to the upper edges of the side walls 80.

Figure 10:
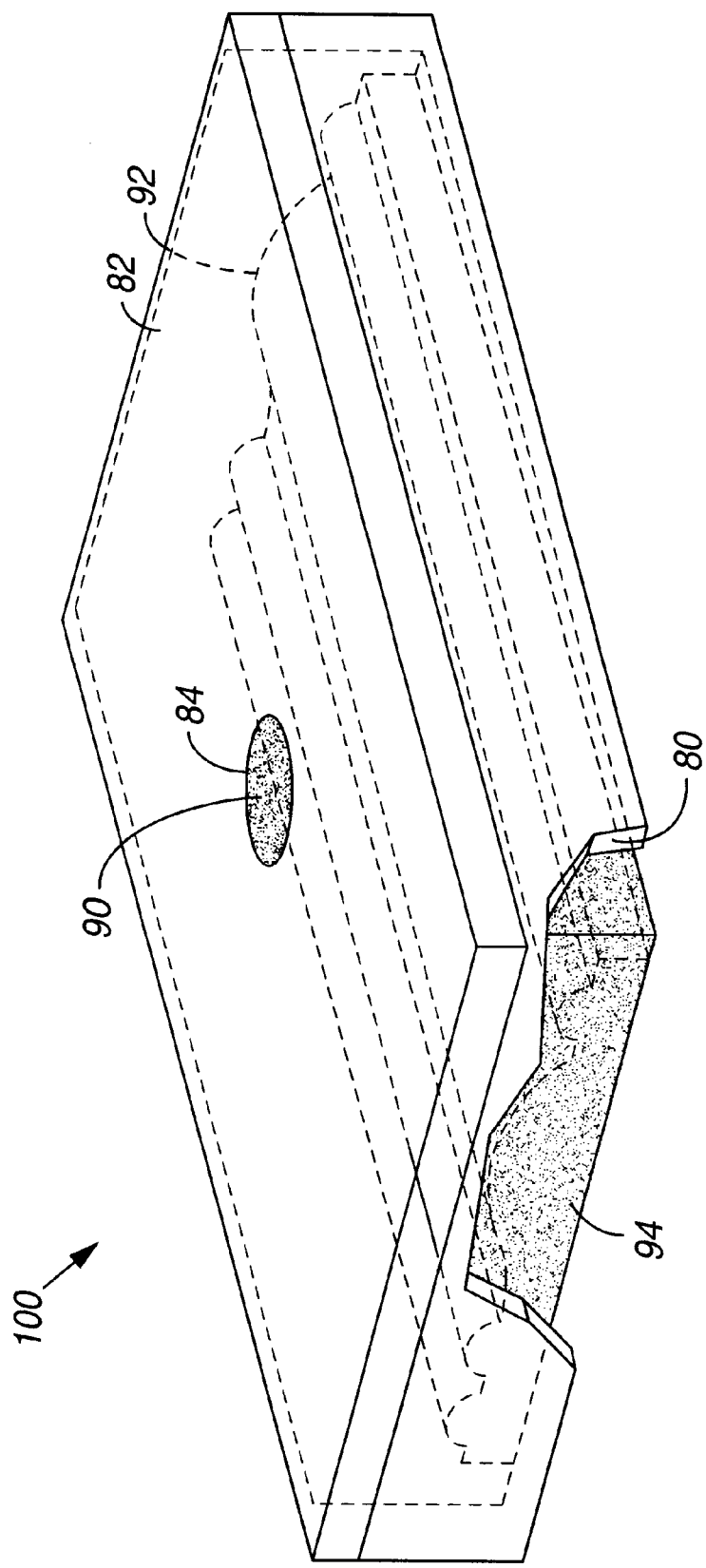
FIG. 10 is a perspective view of the assembly of FIG. 9 filled with a mold cradle foundation material, with the side panels partially cut away, in accordance with the present invention.

Referring now to primarily to FIG. 10, a cradle mold support composition 90 is subsequently introduced through the sprue hole 84 in cover 82, completely filling the box interior defined by sides 74, 80 and 82, and encapsulating form 70 and frame 86. Support composition 90 is then cured for several hours at room temperature. Preferably, support composition 90 comprises a high-density fiber-reinforced liquid polyurethane two-component expanding composition. Significantly, this preferred composition forms a strong chemical bond with the mineral fiber-reinforced hybrid polymer previously deposited on elastomer form 70. Consequently, once composition 90 is cured, the previously deposited coating remains chemically bonded to the surface of mold cavity 92 providing a rigid mold cradle surface.

Subsequently, the wood base 74, positive form 70 and frame 86 are removed, leaving behind the solid mold support having an exterior surface 94 bounded by the interior surfaces of wood panels 80 and 82 and having a nominally oversized mold cavity, shown generally by dotted lines 92, formed therein.

The Resilient Mold

Figure 11:
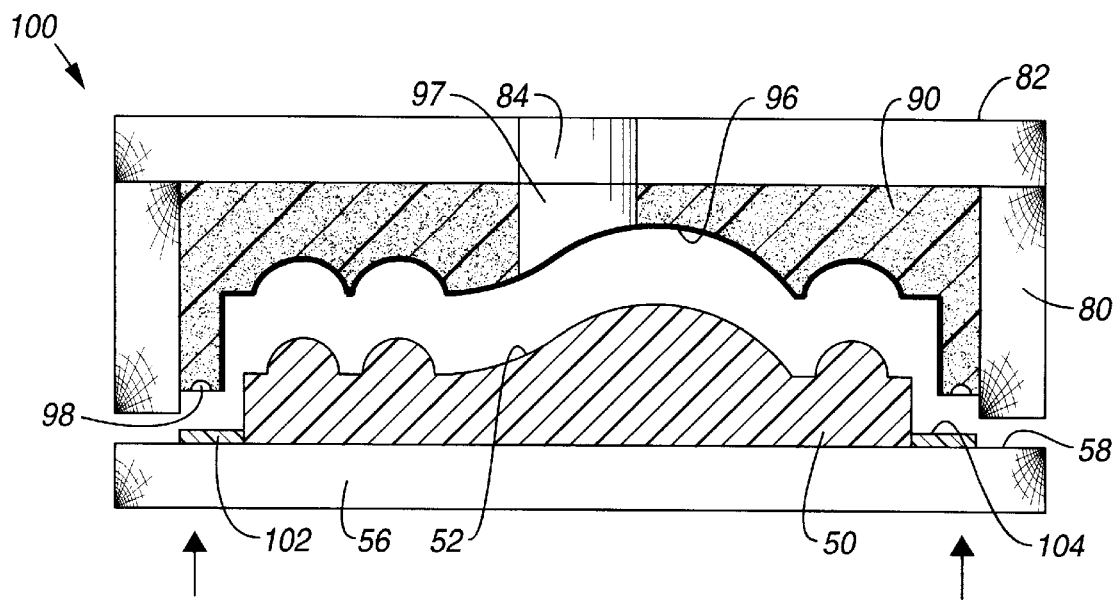
FIG. 11 is a cross-sectional view of the mold cradle of the present invention positioned over the master form shown in FIG. 5, just prior to being filled with silicone mold rubber to create a production mold, in accordance with the present invention.

Referring to FIG. 11, the formation of the resilient mold portion of the mold assembly will now be described in more detail.

Following the production of the mold support cradle, shown generally as reference numeral 100, sprue hole 84 remains filled with cradle support composition 90. Consequently, the sprue hole is initially re-drilled completely through support composition 90, resulting in a new sprue hole having an opening including portion 84 extending through wood base 82 and a portion 97 extending through composition 90. As is also apparent from FIG. 11, the raised surface portions 88 of frame 86, previously mounted on wood base surface 76 (FIG. 9), form depressions 98 in the peripheral surface of cradle support portion 90, the function of which is described below.

Support cradle 100, shown positioned directly over the previously fabricated master form 50 mounted on wood base 56, is sized for direct attachment thereto. As will be apparent to those skilled in the art, alignment pins (not shown) can be used to precisely locate cradle support sides 80 on base 56. Prior to attaching side panels 80 to base 56, master form 50 is treated with release agent and a second frame 102 is positioned on surface 58 of wood base 56, surrounding the periphery of master form 50. Preferably, frame 102 has a thickness less than that of the frame 86 used to create the step between the peripheral edge of cradle support portion 90 and the peripheral edge of wood side walls 80. In this manner, when cradle 100 is moved down and attached to base 56 a small gap remains between the peripheral surface of cradle support portion 90 and the upper surface 104 of frame 102.

Cradle 100 is brought down and side panels 80 are attached to base 56. Then, the gap between the mold cradle 100 and the master form 50 is filled by introducing a silicone mold rubber through the respective aligned sprue holes 84, 97 in wood base 82 and support composition 90. The silicone mold rubber is cured at room temperature for about 24 hours, and then the master mold 50, frame 104 and supporting base 56 are separated from the silicone rubber. As will be apparent to those skilled in the art, various types of silicone mold rubber are commercially available. By way of example, I have found success using HS-2 High Strength Silicone Rubber manufactured by Dow Corning, Inc. of Corning, N.Y.

Figure 12:
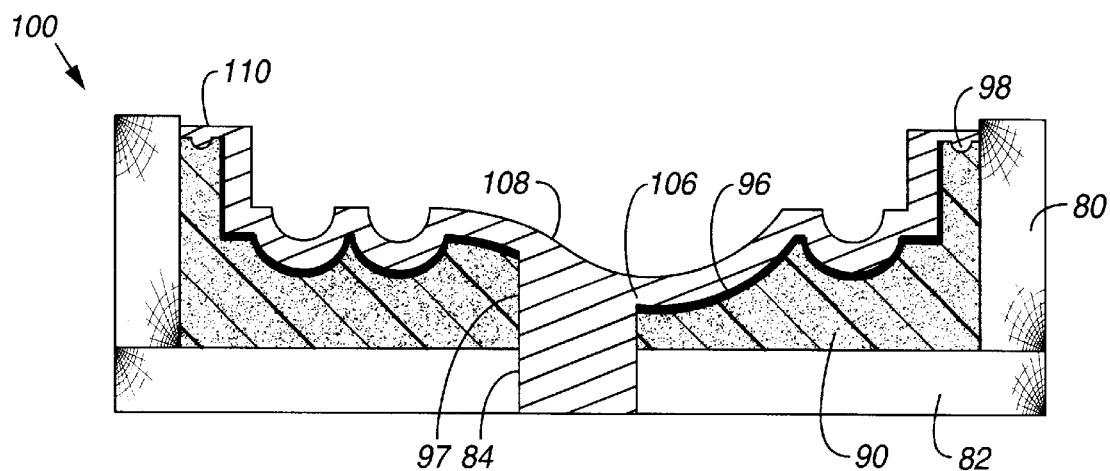
FIG. 12 is a cross-sectional view of a silicone rubber mold 106 coated with a hardened acrylic layer 106 and supported within a mold cradle, in accordance with the present invention.

The resulting mold cradle and resilient mold structure is illustrated in FIG. 12. Upper surface 108 of rubber mold 106 is left with the desired contours and surface texture previously formed on the upper surface 52 of master mold 50. Furthermore, the gap left behind by frame 102 is filled with the silicone rubber to form a lip 110 extending over the peripheral upper edge of cradle support 90 and filling cradle support depressions 98. The mating engagement of the mold lip and cradle support depressions 98, also referred to in the art as "locator keys," functions to prevent undesirable shifting of the rubber mold vis-à-vis the mold cradle during article production.

The Mold lid

Figure 13:
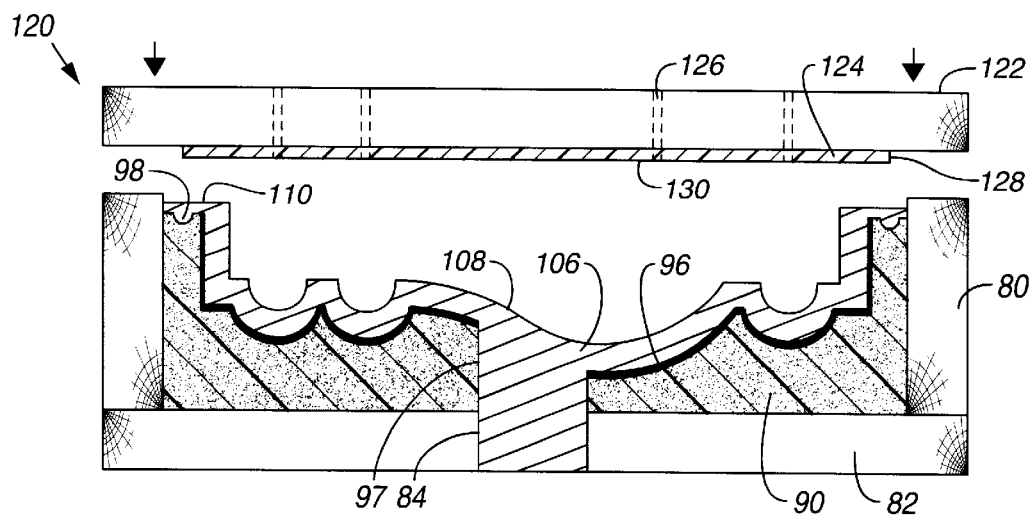
FIG. 13 is a cross-sectional view of the mold/mold cradle assembly of FIG. 12 with a mold cover subassembly 120 illustrated in a slightly raised orientation.

Referring now to FIG. 13, a mold lid, shown generally as reference numeral 120, is comprised of a wood panel 120 having a High-Density Polyethylene (HDPE) substrate 124 attached to its underside. The HDPE layer preferably has a thickness approximating the gap between the upper surface of the rubber mold lip 110 and the upper surface of the side panels 80. Furthermore, HDPE layer 124 preferably has a peripheral edge 128 that aligns approximately with the midpoint of depressions 98 in cradle portion 90. The HDPE substrate acts as a release mechanism, that is, it is not bonded to by the molding material used to produce the final article. In this manner, the HDPE substrate facilitates removal of the lid 120 after the final article has cured.

The lip portion 110 of rubber mold 106 functions as a sealing member, or gasket, when lid 120 is attached to the mold/mold cradle assembly. Significantly, vent holes 126 are provided extending completely through wood panel 122 and HDPE substrate 130. The vent holes 126 release any excess pressure caused by the expanding of the article composition during the manufacturing process, thereby enabling the production of a dimensionally-accurate final article having greatly reduced residual stress.

Method of Article Manufacture

Figure 14:
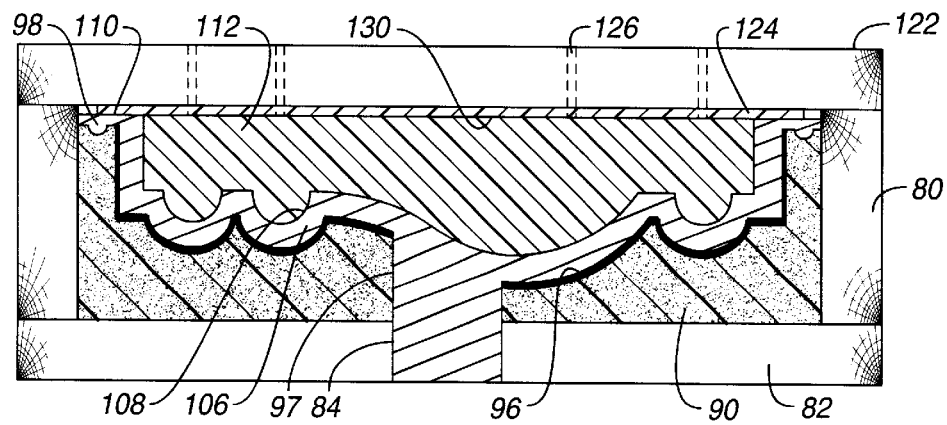
FIG. 14 is a cross-sectional view of the mold/mold cradle assembly of FIG. 13 with the mold cover subassembly 120 in a fully closed position and the covered silicone mold 106 filled with the final product core composition 112.
Figure 15:
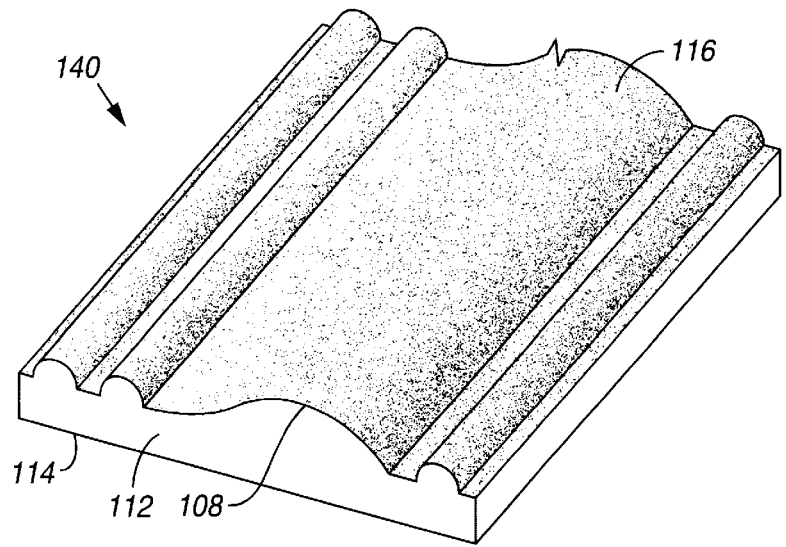
FIG. 15 is a perspective view of the final product 140 produced using the mold assembly of FIG. 13.

Referring now to FIGS. 13–15, the method of manufacturing the articles of the present invention using the novel mold assembly will now be described.

Initially, the mold cavity is treated using a 2-stage process. First, a modified wollostanite mineral fiber-reinforced polyester gel coat is brushed, or otherwise deposited, upon the upper surface of the mold cavity to form an article face coating. By way of example, I have found success using a gel coating composition (reinforced in-house) commonly used during boat manufacturing and commercially available, for instance, from Polymeric Supply, Inc. of Fort Pierce, Fla.

The face coat is gel cured for about 30 minutes and then a modified wollostanite mineral fiber-reinforced acrylic/vinyl ester composition is brushed, or otherwise deposited, on the gel-cured face coat layer to form a back coating. The back coating is also allowed to gel cure for about 30 minutes. This 2-stage process forms the hardened exterior surface of the final article. As used herein, the term "gel-cured" means that the cross-linking reaction of the specific chemical formulation has not achieved maximum peak exotherm and cure. Thus, the chemicals are cured enough to move to the subsequent step without affecting the form of the coating.

Within about 10 minutes after applying the back coating, a precisely determined volume of an expanding modified wollostanite mineral fiber-reinforced high-density closed-cell polyurethane polymer is dispensed into the cavity, and the mold lid is brought down against the mold/mold cradle assembly. The lid is preferably set into a press, or otherwise clamped, for a period of about 10 minutes before the composition is removed from the mold.

During the process, a temperature ranging from about 220° F. to 270° F. (104° C. to 132° C.), and preferably about 250° F. (121° C.), is developed from the exothermic reaction of the combined chemicals. Significantly, this exothermic heat causes molecular fusion of the various layers to one another and complete curing of the product without the need for auxiliary heating.

As best depicted in FIG. 15, as the system cures a molecularly-fused unitary rigid article is produced having a size, shape, and textured surface 116 substantially identical to the master form 50. In particular, the article 140 has a hardened two-layer outer surface, shown generally as reference numeral 108, comprised of the acrylic-vinyl ester back coating and polyester gel face coating, molecularly fused to the rigid polyurethane foam core 112. A planar rear surface 114 results from the incorporation of a planar HDPE lid substrate.

Figure 16:
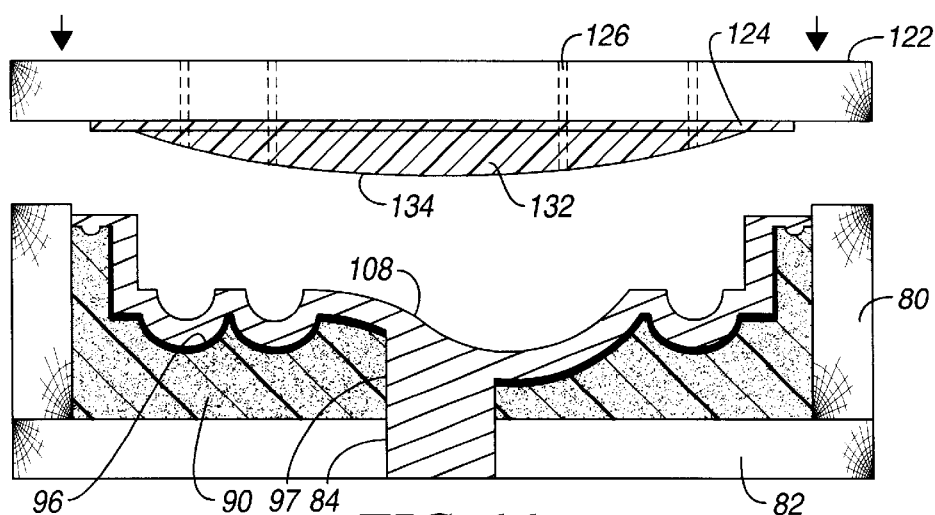
FIG. 16 is a cross-sectional view of the mold/mold cradle assembly of FIG. 12 wherein the mold cover subassembly is depicted slightly raised and including a non-planar member 132 to produce a final product having a non-planar rear surface.
Figure 17:
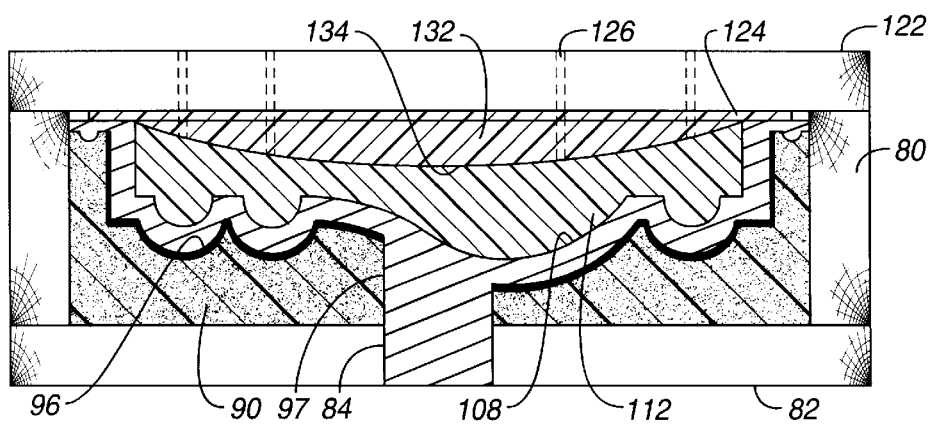
FIG. 17 is a cross-sectional view of the mold/mold cradle assembly of FIG. 16 with the mold cover in a fully closed position and the covered silicone mold 106 filled with the final product composition 112.
Figure 18:
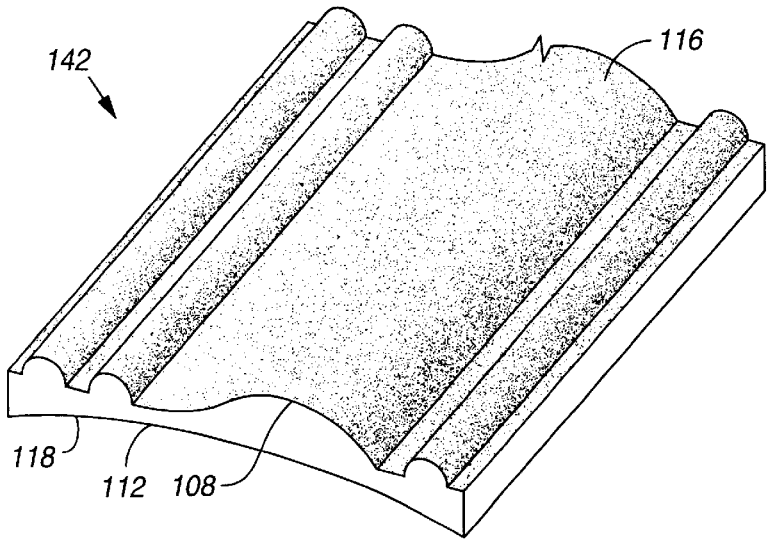
FIG. 18 is a perspective view of the final product 142 produced using the mold assembly of FIG. 16.

Referring briefly to FIGS. 16–18, it is seen that a secondary HDPE member 132 having a non-planar lower surface 134 can be employed to produce a final article 142 having a non-planar lower surface 118.

With respect to comparable articles produced by the methods of the prior art, the final article produced in accordance with the present invention has a greatly reduced weight, improved dimensional stability under most environmental conditions, greatly enhanced durability and significantly reduced residual stress. The manufactured articles are amenable to being cut, nailed and installed as easily as a conventional piece of wood.

Since many modifications, variations, and changes in detail can be made to the described preferred embodiments of the invention, it is intended that all matters in the forgoing description and shown in the accompanying drawing be interpreted as illustrative and not in a limiting sense. Thus, the scope of the invention should be determined by the appended claims and their legal equivalence.

What is claimed is:

1. A method for manufacturing a mold assembly to produce an article having a simulated stone or wood appearance, comprising the steps of:
   providing a master form having a predetermined shape, surface contour and surface texture;
   mounting the master form on a base substrate;
   providing a master mold cradle having a mold cavity formed therein, the mold cavity having a shape and surface contour substantially complementary to the shape and surface contour of the master form but having dimensions greater than the corresponding dimensions of the master form;
   positioning the master mold cradle over the master form to define a gap therebetween;
   filling the gap with a resilient material;
   curing the resilient material; and
   separating the master form and master form base from the master mold cradle.

2. A method as recited in claim 1, wherein the step of providing a master form further comprises the steps of:
   providing a slab of wet plaster;
   excising a negative master form from said wet plaster slab;
   surrounding the negative master form with side panels to define a cavity; and
   filling the cavity with a master form material.

3. A method as recited in claim 2, wherein the step of excising further comprises running a blade having a desired negative profile through the slab of wet plaster.

4. A method as recited in claim 1, wherein the step of providing a master form further comprises the steps of:
   providing a form having a desired shape and surface profile;
   producing a mold cavity from said form;
   depositing texture-producing particles into said mold cavity,
   filling said mold cavity with a master form material;
   curing said master form material; and
   removing said cured composition from said mold cavity.

5. A method as recited in claim 4, further comprising prior to the step of depositing, the step of applying a mold release composition into said mold cavity.

6. A method as recited in claim 5, wherein said mold release composition further comprises a peanut oil and polymer bled.

7. A method as recited in claim 1, wherein the step of providing a mold cradle further comprises the steps of:

constructing an open-topped mold box having a base and side walls, the base having a sprue hole provided therein;

positioning the open top of the mold box over a mold form mounted on a base and having a substantially complementary shape and surface profile as the master form but dimensioned nominally larger than the master form to define a gap therebetween;

introducing a mold cradle support composition through the sprue hole;

curing the cradle support composition; and separating the mold form and mold form base from the mold box and cured cradle support composition.

8. A method as recited in claim 1, further comprising, prior to the step of positioning, the step of disposing a frame member on the master form base substrate, the frame member surrounding the perimeter of the master form.

9. A method for manufacturing an article having a simulated stone or wood surface, comprising the steps of:

providing a resilient rubber mold having a mold cavity formed in an upper mold surface and a rear mold surface completely supported by a form fitted mold support cradle;

coating the mold cavity with a fiber reinforced polyester gel face coat;

at least partially curing said face coat;

depositing a fiber reinforced acrylic/vinyl ester back coating upon said face coating;

at least partially curing said back coating;

depositing a predetermined volume of fiber-reinforced high-density closed-cell polyurethane polymer into the coated mold cavity;

covering the mold cavity with a mold lid; and applying pressure to the mold.

10. A method as recited in claim 9, wherein said fiber further comprises wollastonite.

11. A method as recited in claim 9, further comprising, prior to the step of coating, the step of treating the mold cavity with a mold release composition.

12. A method as recited in claim 11, wherein said mold release composition further comprises a peanut oil and polymer blend.

* * * * *